(12) United States Patent
Liu et al.

(10) Patent No.: US 7,959,961 B2
(45) Date of Patent: Jun. 14, 2011

(54) FOOD PRODUCTS CONTAINING RICE BRAN OIL

(75) Inventors: Xia Liu, Maple Grove, MN (US); Monica Decastro, Baldwin, WI (US)

(73) Assignee: General Mills IP Holdings II, LLC, Minneapolis, MN (US)

( * ) Notice: Subject to any disclaimer, the term of this patent is extended or adjusted under 35 U.S.C. 154(b) by 1533 days.

(21) Appl. No.: 11/347,134

(22) Filed: Feb. 3, 2006

(65) Prior Publication Data

US 2006/0182869 A1 Aug. 17, 2006

Related U.S. Application Data

(60) Provisional application No. 60/649,866, filed on Feb. 3, 2005.

(51) Int. Cl.
- A23L 1/10 (2006.01)
- A23L 1/18 (2006.01)
- A23P 1/08 (2006.01)

(52) U.S. Cl. .......... 426/549; 426/99; 426/620; 426/621; 426/310

(58) Field of Classification Search .................... 426/549
See application file for complete search history.

(56) References Cited

U.S. PATENT DOCUMENTS

| | | | |
|---|---|---|---|
| 3,111,409 A * | 11/1963 | Jackson et al. | 426/24 |
| 3,268,338 A * | 8/1966 | Strobel | 426/330 |
| 4,089,984 A | 5/1978 | Gilbertson | |
| 4,379,171 A | 4/1983 | Furda et al. | |
| 4,438,146 A * | 3/1984 | Colby et al. | 426/448 |
| 4,539,211 A | 9/1985 | Armando et al. | |
| 4,734,289 A * | 3/1988 | Yamaguchi et al. | 426/302 |
| 4,853,235 A | 8/1989 | Tomomatsu | |
| 5,176,936 A * | 1/1993 | Creighton et al. | 426/618 |
| 5,342,188 A | 8/1994 | Zimmermann | |
| 5,919,503 A * | 7/1999 | Leusner | 426/96 |
| 5,942,273 A * | 8/1999 | Mochizuki et al. | 426/549 |
| 6,149,965 A | 11/2000 | Van Legerich et al. | |
| 6,183,788 B1 * | 2/2001 | Leusner | 426/96 |
| 6,210,720 B1 * | 4/2001 | Leusner et al. | 426/74 |
| 6,291,008 B1 * | 9/2001 | Robie et al. | 426/620 |
| 7,033,626 B2 * | 4/2006 | Spendler et al. | 426/18 |
| 7,413,760 B2 * | 8/2008 | Green et al. | 426/620 |
| 2005/0058759 A1 * | 3/2005 | Schmidt | 426/549 |
| 2005/0255218 A1 * | 11/2005 | Green et al. | 426/619 |
| 2005/0281930 A1 * | 12/2005 | Nowakowski et al. | 426/549 |

FOREIGN PATENT DOCUMENTS

CA 1168919 4/1912

OTHER PUBLICATIONS

Rukmini, C. et al. 1991. U. of the American College of Nutrition 10(6)593-601.*
McCaskill, D. et al. 1999. Food Technology 53(2)50-52.*
Orthoefer, P. T. 1993. Rice bran oil characteristics. Paper presented at the 84th Am. Oil Chemists'Society's Annual Meeting, Anaheim, Calif. Apr. 29.*
Orthoefer, F. Food Technology 1996. December issue, p. 62-64.*
McEwan, M. et al. 2005. Journal of Food Science 70(7)S453.*
Perez-Jimenez, J. et al. 2005. J. Agric. Food Chem. 53:5036-5040.*
Xu, Zhimin et al. 2001. J. Agric. Food Chem. 49:2077-2081.*
Shen, Z. et al. 1996. J. Agric Food Chem. 44:3033-3039.*
Fritsch, C. W. et al. 1977. J. American Oil Chemists' Society 54:225-228.*

* cited by examiner

*Primary Examiner* — Carolyn A Paden
(74) *Attorney, Agent, or Firm* — John A. O'Toole; Everett G. Diederiks

(57) ABSTRACT

Disclosed are cooked dried farinaceous food products such as cooked cereal doughs, ready-to-eat cereals and grain based snacks fabricated from such cooked cereal doughs containing or fortified with rice bran oil supplied at least in part by non-hydrogenated rice bran oil especially high oryzanol rice bran oil. The cereals contain about 0.1 to 10% added rice bran oil. The rice bran oil ingredient can be incorporated into the dough and/or topically applied. The rice bran oil provides the processing advantages of oil addition during processing with low or now transfatty acids but with extended shelf stability. The finished fortified cereal products are not only organoleptically desirable but almost indistinguishable from their counterparts containing hydrogenated fats.

23 Claims, No Drawings

FOOD PRODUCTS CONTAINING RICE BRAN OIL

CROSS-REFERENCES TO RELATED APPLICATIONS

This application claims the benefit of priority under 35 U.S.C. §119(e)(1) of a U.S. provisional patent application Ser. No. 60/649,866, filed Feb. 3, 2005, which is incorporated herein by referenced in its entirety.

BACKGROUND OF THE INVENTION

The present invention relates to food products and to their methods of preparation. In particular, the present invention relates to food products prepared from a cooked cereal dough, especially ready-to-eat cereals and to their methods of preparation.

A wide variety of food products are prepared from cooked cereal doughs especially ready-to-eat ("R-T-E") or breakfast cereals, as well as a variety of snack products. Generally in the preparation of the cooked cereal dough, cereal or farinaceous ingredients such as various cereal flours are first admixed with other dry ingredients such as salt, minerals, starch, sugars, to form a dry blend of ingredients and then is further blended with various liquid ingredients, including moisture and heated to gelatinize or cook the starch fraction of the cereal ingredients and other starchy materials. The gelatinized or cooked mass is then worked to form a cooked cereal dough. A wide variety of blending cooking, working apparatus and techniques are well known. More recently, the preparation of a cooked cereal dough using a cooker extruder especially a twin screw extruder has become commonplace. The cooked cereal doughs so prepared can be processed to form finished products of various size, textures, and shapes. Typically, the post, cooked cereal dough formation step involves forming suitably sized and shaped individual pieces and drying to form finished cereal base pieces such as shreds, flakes, biscuits or puffs. Thereafter, the finished dried cereal base pieces can have a topical coating applied to provide desired taste and texture attributes. For example, in the preparation of a breakfast cereal, the topical coating can include a sugar coating. In other variations, such as for seasoned snack products, the topical coating can include salt alone or in combination with various seasoning blends.

Frequently the blend of ingredients from which the cooked cereal dough is prepared can include low levels of an added fat ingredient. Added fat is to be distinguished from native levels of fat provided by employment of any other ingredient especially the native fat associated with the employment of whole grain cereal ingredients or flours. Inclusion of fats can be made as a processing aid to facilitate the mixing of the ingredients, or to improve the workability of the cooked cereal dough such as in a cooker extruder, or to control or limit the degree of expansion of the cooked cereal dough when used to prepare puffed cooked cereal dough pieces. Generally, the fat is added at low usage levels; typically about 3% or less. Since the finished dried cooked cereal dough cereal pieces are generally used to prepare shelf stable finished food products that are intended to be stored at room temperatures for extended times, these processing aid fat ingredients typically were provided in the form of at least partially hydrogenated fats in order to reduce rancidification of the fat ingredient over extended storage times. While extremely useful, and of widespread employment for decades, current health and nutrition trends disfavor employment of hydrogenated fats since such fats often contribute undesirable trans fatty acids.

While non hydrogenated liquid oils such as common commodity oil types e.g. soybean oil, corn oil, canola oil can be used as processing aids, the resultant finished products can exhibit greater degrees of and faster rates of product rancidification due to the absence of hydrogenation and/or the greater degree of unsaturation.

One technique to minimize the rancidification potential of employing non hydrogenated fats or oils is to add antioxidants or preservatives such as vitamin E, BHA (Butylated hydroxyanisole), BHT (butylated hydroxytoluene), TBHQ (Tert-Butyl Hydroquinone), that are known to reduce rancidification rates. While useful, to be most effective, such materials need to be added after any heating step since exposure to harsh temperature conditions can lead to rapid loss of the preservative. However, cooked cereal dough preparation generally requires at least some heat exposure (to gelatinize the starch fraction) and often the heating and cooking step can be prolonged (for up to several hours). Even post cooking steps such as puffing, drying or application of a topical coating, e.g., sugar, involves one or more steps that involve heat exposure. Such heating can result in significant or even substantially total loss of the preservative in the finished cooked cereal dough product.

Another approach to avoid the problems of undesirably rapid rancidification is to employ a specialty oil that is naturally resistant to rancidification such as a high oleic fatty acid oil. While useful to mitigate the degree and rate of rancidification, such specialty oil ingredients command premium prices and are subject to limitations on sourcing and usage.

An additional consideration for commercial preparation of breakfast cereals is that the sourcing of high oleic oil is not without some risk. The feedstock for such specialty oils are grown in only narrow climatic zones especially in Canada and the Northern United States. Thus, this ingredient supply is subject to a higher level of weather related availability risk.

Surprisingly, it has been found that rice bran oil can be used as a processing aid ingredient in the preparation of cooked cereal doughs and finished food products prepared there from. It has been more surprisingly been discovered that high oryzanol rice bran oil is particularly effective at providing the desirable functionality of a fat cereal dough preparation processing aid; is surprisingly resistant to rancidification in finished food products prepared from cooked cereal doughs even when stored at room temperatures for extended periods. Notwithstanding the surprising resistance to rancidification, the high oryzanol rice bran oil nonetheless, desirably provides levels of trans fatty acids. Moreover, high oryzanol rice bran oil is commercially available in commercial quantities at competitive pricing.

The present invention is thus directed towards formulating cooked cereal doughs with a reduced cost non hydrogenated oil ingredient that provides comparable levels of resistance to rancidification in cooked cereal dough products to the rancidification of such specialty oil ingredients and superior to that of commodity oil ingredients.

BRIEF SUMMARY OF THE INVENTION

The present invention provides cooked cereal compositions such as cooked cereal doughs comprising an added rice bran oil ingredient and especially high oryzanol rice bran oil and further provides dried finished cereal food products fabricated there from such as ready-to-eat ("R-T-E") or breakfast cereals and grain based snacks.

The dried cereal finished products are fabricated from cooked cereal doughs that can comprise conventional cereal ingredients and about 0.1 to 10% (i.e., up to about 3 g/oz) of added or supplemental non hydrogenated rice bran oil as added fat. All or a portion of the rice bran oil can be topically applied and all or a portion can be incorporated in the cooked cereal dough from which individual pieces are fabricated. Notwithstanding concentrations of the added fat, the finished fortified cereal products are not only organoleptically desirable but almost exhibit surprising moderate levels of rancidification (under 1 ppm hexanal) even after six months of room temperature storage in conventional product packaging.

In its method aspect, the present invention resides in methods for preparing the present rice bran oil containing compositions and finished R-T-E products prepared there from. In one embodiment, the methods can comprise:
   A. providing a cooked cereal dough or mass containing added rice bran oil;
   B. forming the cereal dough into pieces; and,
   C. drying the cereal pieces to form the finished food products fortified with rice bran oil.
In another embodiment all or at least a portion of the rice bran oil is topically applied to the piece.

DETAILED DESCRIPTION OF THE INVENTION

The present invention relates to cooked cereal doughs containing rice bran oil, to finished dried grain based products prepared there from and to methods for their preparation. Each of these product constituents, as well as methods for their preparation and use are described in detail below. Throughout the specification and claims, percentages are by weight and temperatures in degrees Celsius, unless otherwise indicated. All referenced patents and patent application herein are hereby incorporated by reference.

The dried cereal finished products are fabricated from cooked cereal doughs that can comprise conventional cereal ingredients and about 0.1 to 10% (i.e., up to about 3 g/oz) of added or supplemental non hydrogenated rice bran oil as added fat. All or a portion of the rice bran oil can be topically applied and all or a portion can be incorporated in the cooked cereal dough from which individual pieces are fabricated. Notwithstanding concentrations of the added fat, the finished fortified cereal products are not only organoleptically desirable but almost exhibit surprising moderate levels of rancidification (under 1 ppm hexanal) even after six months of room temperature storage in conventional product packaging.
Providing A Rice Bran Oil Containing Cooked Cereal Dough In the preferred embodiment, the present methods can comprise a first step of providing a cooked cereal composition such as a cereal dough or cereal mass containing added rice bran oil within the herein specified ranges.

As is well known, a cooked cereal dough can be prepared by blending various dry cereal ingredients together with water and cooking to gelatinize the starchy components and to develop a cooked flavor. The cooked material can also be mechanically worked to form a cooked cereal dough. The cooking and mechanical work can occur simultaneously or sequentially. The dry ingredients can also include various additives such as sugar(s), salt and mineral salts, e.g., trisodium phosphate, and starches. In addition to water, various liquid ingredients such as corn (maize) or malt syrups can be added. A cooked cereal mash is quite similar except that larger sized particles such as whole grains or cut grains are cooked rather than cereal flour ingredients.

An essential component of the present cereal compositions is a starchy cereal(s). The starchy cereal component can comprise any conventionally employed starchy cereal or, synonymously, farinaceous material, for use in a ready-to-eat cereal. Exemplary suitable starchy cereals include cereal grains, cut grains, grits or flours from wheat, rice, corn, oats, barley, rye, triticale or other cereal grains and mixtures thereof. The flours can be whole flours or flour fractions such as with the germ fraction or husk fraction removed or, alternatively, brans. Of course, the R-T-E cereal art is well developed and the skilled artisan will have no difficulty selecting suitable farinaceous materials for use herein.

The starchy cereal component(s) can comprise from about 40 to 99% (dry basis) of the cooked cereal dough composition. Better results in terms of organoleptic attributes and reductions in R-T-E cereal piece frangibility are obtained when the cereal ingredient(s) comprises about 75 to 95% of the cooked cereal dough composition. For best results the cereal ingredients comprise about 80 to 95% of the present cereal products. In one particular embodiment, for example, a food product contains about 85-99.9% (dry weight) of a cereal dough.

The cooked cereal dough additionally comprises about 10 to 55% moisture. The amount of moisture depends, in part, upon the particular cereal ingredients, desired finished products, cooking equipment and techniques employed. Dried finished products prepared from such cooked cereal dough products can range from about 3% to 12%, preferably about 4% to 6%.

Broadly, the present invention provides food compositions that can comprise a cooked cereal dough or cereal mass containing or fortified with rice bran oil. The rice bran oil is included in substitution for known hydrogenated fats added to facilitate the processing of cooked cereal doughs and products produced there from.

The food compositions can comprise about 90% to 99.9%, preferably about 97 to 99.5% of the cooked cereal dough (dry weight basis) and the balance non hydrogenated rice bran oil. That is, the rice bran oil can be present in the cooked cereal dough from about 0.1% to about 5%, preferably about 0.5% to 3%. Finished products prepared from the cooked cereal dough can range from about 0.1% to about 10% of rice bran oil. In certain variations, in addition to any rice bran oil that can be added to the cooked cereal dough from which the products are fabricated, additional rice bran oil can be topically applied as a coating or as part of a coating as described in more detail below. Such rice bran oil fortified cooked cereal doughs are useful for fabrication into finished dried grain based food products such as R-T-E cereals and grain based snack products.

Rice bran oil is well known and is a staple of commerce. Rice bran oil is a typically produced by solvent extraction from rice bran. In the preferred embodiment, the rice bran oil is non-hydrogenated. In less preferred embodiments, the rice bran oil can be partially hydrogenated (or blends of partially hydrogenated and non hydrogenated rice bran oils) or admixed with hydrogenated fats. In other less preferred embodiments, while the rice bran oil itself is not blended with hydrogenated oils (whether or not rice bran oil); the farinaceous doughs herein can include low levels of added hydrogenated fats in addition to the present rice bran oils.

In a highly preferred embodiment herein, the rice bran oil is a high oryzanol rice bran oil. Oryzanols are a well known class of various types of naturally occurring ferulic acid esters that can be present in rice bran oils. High oryzanol rice bran oils are those rice bran oils having about 0.8%, preferably 1% or more oryzanol(s) constituents. In contrast, conventional rice bran oils generally have low levels (less than 0.1%) oryzanol. Such high oryzanol oils are also commercially available such as from RITO (8 Jackson Street San Francisco Calif. 94111; a joint venture partnership between Riceland Foods Inc. and Oilseeds International Inc.). Surprisingly, high oryzanol rice bran oils provide unexpected superiority against rancidification in the cooked cereal dough products of the present invention when used at equivalent oil levels compared to conventional rice bran oils or conventional non hydrogenated vegetable oils. While not wishing to be bound by the proposed theory, it is speculated herein that the oryzanols provide natural anti oxidant properties to the rice bran oils. High oryzanol rice bran oils are generally prepared by subjecting the rice bran to a heating step to inactivate various lipase enzymes prior to solvent extraction (typically with hexane) of the high oryzanol rice bran oil.

Oryzanols are a well known class of food constituents and the skilled artisan will have no difficulty selecting analytical techniques for determining oryzanol levels in particular rice bran oils. For example, RITO, a high oryzanol rice bran oil supplier, uses the following spectrophotometric procedure for measuring oryzanol levels:

Method: Oryzanol content in rice bran oil by spectrophotometer.

Definition: This method uses the Genesis spectrophotometer to determine the total amount of oryzanol present in rice bran oil.

Procedure:
1. Fill a 1 cm quartz spectrophotometer cell with HPLC grade chloroform, wipe down the optical sides with a lint free tissue or cloth, and run as a blank on the spectrophotometer. Read and record baseline peak between 310 and 320 μm.
2. Weigh accurately 0.2 grams of rice bran oil into a 100 mL volumetric flask and record weight.
3. Fill volumetric flask to 100 ml mark with chloroform. Mix well.
4. Fill a 1 cm quartz spectrophotometer cell with the sample mixture.
5. Read the absorbance of the sample at the highest peak between 310-320 μm. If the absorbance reading errors to maximum, repeat the procedure with the sample weight as 0.1 gram.
6. Calculate % oryzanol using the following equation.

Calculations:

% Oryzanol=$[(S-B)*100]/$(sample weight*359)

Where S=Sample absorbance reading
B=Blank absorbance reading

In other less preferred variations the rice bran oil and/or the high oryzanol rice bran oil can be diluted with conventional non hydrogenated oils such as soybean oil, corn oil, canola oil, corn oil, cottonseed oil, peanut oil, and mixtures thereof. Of course, the benefits of mitigated rancidification can be less as the extent of the substitution increases. For this reason, less substitution is preferred to greater substitution. More specifically, it is preferred to have the non rice bran oil added oil contribute less than 30% of the added oil component, and more preferably less than 15%. If diluent oil is to be employed, then most preferred for use herein is a high oleic fatty acid content canola oil since such specialty non-hydrogenated soybean oils are likewise resistant to rancidification. Both rice bran oil and peanut oil, for example, share certain oil properties such as a high smoke point temperature. However, notwithstanding this common feature, surprisingly, peanut oil can not be used in full substitution for the present rice bran oil although modest dilution with peanut oil (or equivalently with other common oils) can be practiced. Thus teachings regarding the use of high smoke point oils such as rice bran oil or peanut butter oil or other oils provide no guidance for selection of rice bran oil especially the high oryzanol rice bran oil for use herein.

In certain preferred embodiments, all or a portion of the cereal ingredients can be provided in the form of whole grain flours. Such whole grain flours can thus include the bran and germ fractions in addition to the starchy fractions of refined cereal flours. Such whole grain flours will contribute native levels of the oil fraction associated with the whole grain, e.g., whole grain wheat flour will include native levels of wheat germ oil. Certain whole grain cereal types, e.g., especially whole grain oat flours, have high levels of native oil constituents even up to 8% of the whole grain flour. The present added rice bran oil ingredient levels herein are thus supplemental to the native oil content contributed by such native oils of such whole grain ingredients. Thus, a 10% added rice bran oil embodiment of a finished food product fabricated from a cooked cereal dough comprising 95% oat flour can provide total fat levels (native fat levels plus added fat) of up to nearly 18%.

The skilled artisan will also appreciate that the presence in a cooked cereal dough of such native cereal oils not only adds to the total fat content but that the presence of such native fat contents can reduce the need for adding higher levels of added fat such as the present rice bran oils to provide the desired processing benefits of fat addition. Since the natural oil content of wheat can range from about 1 to 3%, the total fat content of the finished product will be the sum of the natural or native oil associated with the cereal constituents plus the added pure rice bran oil or other supplemental added fat material. Thus, those embodiments that comprise significant levels of whole grain flours, e.g., 40% or greater (dry weight basis) of the finished food products, the amount of added rice bran oil fat can be in the lower portion of the present added fat ranges. The skilled artisan will also appreciate that the cooked cereal doughs can comprise a whole grain rice component that will contain low levels of native rice bran oil associated with the germ fraction of such whole grain rice flour. The amounts described herein for added rice bran oil as a separate ingredient then are to be above any such minor contributions from such whole grain constituents.

The present cooked cereal compositions and products prepared there from can comprise about 0.1% to 15% by weight (dry basis), i.e., up to about 4+ g/oz, of added rice bran oil. For RTE cereal products, better results in terms of balancing the processing aid benefits, especially, balanced with acceptable organoleptic attributes are obtained when the added rice bran oil is present at a concentration range of from about 0.5 to 8% by dry weight of the cereal, preferably about 1 to 8%, and for best results about 2% to 4%.

The art also contains teachings regarding certain health benefits especially cholesterol lowering benefits of rice bran oil consumption. While the addition of rice bran oil herein can provide some incidental nutraceutical benefit, the present added rice bran oil levels herein are such as to provide primarily cooked cereal dough processing benefits and are not intended to be included at therapeutically effective levels. However, the present finished food products can enjoy a certain halo effect by consumers who are aware of the health benefits of rice bran oil.

In the commercial preparation of R-T-E cereals, a single manufacturing facility can be used to prepare commercial a wide variety of R-T-E cereals. Generally such production facilities include only a certain limited raw material supply systems including oil storage facilities. It is an advantage of the present invention that not only can rice bran oil provide the cereal dough processing advantages with reduced tendency towards rancidification but that the rice bran oil can be used in connection with a the preparation of a wide variety of R-T-E cereal formulations and finished product types. Moreover, notwithstanding the description in the background section herein regarding the limitations of using chemical preservatives, the present rice bran oil can be provided with permitted levels of such chemical preservatives. These added chemical preservatives can be used to reduce initial rancidification of the rice bran oils prior to addition cooked cereal doughs such as in the storage systems of commercial production facilities. Any residual chemical preservatives in the finished products merely helpfully augment the rice bran oils' resistance to rancidification in the finished products.

Still another advantage of rice bran oil is that inclusion of such oil can be made to a wide variety of finished cooked cereal dough food products without violation a various religious restrictions.

Hexanal is a common marker for lipid oxidation leading to rancidification. As the concentration of hexanal increases, consumers will increasingly become aware of unpleasant smells and, to a somewhat lesser extent, of off-flavors. The present finished products can have by low hexanal values even after extended storage (in suitable conventional food product packaging) of up to six months. Such products have hexanal values of lppm or less above which level consumer complaints rapidly increase. However, certain finished cooked cereal dough products can include flavors or other ingredients that can mask the rancidification. For example, certain highly flavored finished products such as those that are chocolate flavored can mask hexanal levels that would be highly undesirable in more blandly flavored products. Also, certain products have inherently higher level of brown flavor notes that either masks hexanal or even inhibit rancidification. For example, whole wheat cereal flakes have strong cooked or brown cereal notes. Also, the cooking process can develop chemical constituents that apparently ameliorate rancidification rates. Finished products having even 2 ppm hexanal are safe to consume although can be of reduced aesthetic appeal.

An advantage of the present invention is that rice bran oil can be used in connection with a wide variety of dried finished grain based products fabricated from cooked cereal doughs such as R-T-E cereal products. Such products can vary widely, not only in composition, but also in final physical form. Thus, the present invention can be used to prepare R-T-E cereals in the form of shreds, biscuits and puffs as well as the preferred flake form.

Moreover, while the invention finds particular suitability for use in connection with the provision of R-T-E cereals fabricated from cooked cereal doughs, the skilled artisan will appreciate that the present rice bran oil fortified cooked cereal doughs can find applicability for use in connection with other grain based food products such as grain based snack products. Also, a wide variety of snack food items can also be prepared from the present rice bran oil fortified cooked cereal doughs. For example, the rice bran oil fortified cooked cereal doughs can be formed into suitably sized, shaped and partially dried pellets or half products. These half products are useful intermediate products. Finished grain based snack products are usually provided by the deep fat frying or other puffing of the pellets (e.g., hot air or microwave heating) of partially dried half products fabricated from cooked cereal doughs. An advantage of half products is that they can be produced in bulk in one location and thereafter fried in one or more finish operations to form the finished snack products. Not only is shipping costs reduced due to the reduced volume of the half products compared to the finished products but also breakage of the finished product is reduced. Also, the present invention can be used to provide pretzel snack products fortified with rice bran oil. In still other variations, the food products can be baked such as to form a cracker. In still another variation, the dough products can be uncooked. For example, an uncooked refrigerated or frozen dough product (suitable for finish baking by a consumer or a commercial baker) to form a baked good, e.g. bread, cookie, cinnamon roll, crescent roll or biscuit. The uncooked or fresh doughs can be leavened using either chemical leavening or yeast. Uncooked unleavened products can include flour or corn tortillas. In still other variations, various masa dough products can be used to make the tortillas. A potato based dough can be used, for example, to make Swedish lefsa. In still other variations, the food products can be an animal feed such as for domestic pets.

In certain variations of the present invention, lower levels of rice bran oil can be topically applied to finished dried cereal products. In less preferred variations, the cooked cereal dough pieces are finished dried such as by deep fat puffing and drying using rice bran oil, especially the high oryzanol rice bran oil as a frying oil. In these embodiments, the finished products can be characterized by high levels (e.g. up to 40% by weight basis) in the finished products.

If desired, the present cereal dough composition can additionally comprise about 0.1 to about 20% (dry weight) by weight sugar(s) or, synonymously herein, nutritive carbohydrate sweetening agents, preferably about 0.5% to 5%. Such materials are also well known in the R-T-E cereal art. Useful herein as the sugar component is sucrose. However, the sugar(s) component can additionally comprise conventional fructose, maltose, dextrose, honey, fruit juice solids, brown sugar, and the like. In addition to providing desirable sweetness, the sugar component additionally beneficially affects the cereal color and texture. Better results are obtained, especially for R-T-E cereal products, when the sugar(s) component comprises from about 1% to about 10% by weight of the composition.

In a preferred embodiment for ready-to-eat cereals, the present cereal compositions are further can defined in part by low fat levels, i.e., the present cereals do not comprise added or absorbed fat. Thus, the total fat or lipid component is quite low. The fat content results from the native fat associated with the starchy cereal component(s). Permissible low fat additions can also result from adding emulsifiers and from vitamin or flavor addition. However, the total fat content of the cereal compositions should be less than about 3%, preferably less than about 2%. Preferably, the R-T-E cereal is substantially free of any fat or oil incorporated into the cooked cereal dough. Such "added fat" is to be distinguished from "absorbed fat" that is picked up during deep fat frying used to prepare finished snack products herein. In more preferred embodiments, If desired, the present cereal dough composition can additionally include a variety of materials designed to improve the aesthetic, organoleptic or nutritional qualities of the cereal. These adjuvant materials can include vitamin and/or mineral fortification, colors, flavors, high potency sweetener(s), and mixtures thereof. The precise ingredient concentration in the present cereal composition will vary in known manner. Generally, however, such materials can each comprise about 0.01% to about 2% dry-weight of the cereal composition.

One especially useful material is common salt. Desirably, the salt comprises about 0.1 to 2%, preferably about 0.5 to 1.0% of the cereal composition.

Still another highly preferred ingredient is a malt syrup flavor ingredient. The malt syrup comprises about 1 to 8% (dry basis), preferably about 2 to 5%.

Fiber is believed to adversely affect selected mineral and vitamin absorption. Accordingly, in highly preferred embodiments, in particular, the present R-T-E cereals can be fortified with bioavailable sources of calcium, iron, riboflavin and the like. These mineral fortifiers can be incorporated into the cereal compositions directly. It is also desirable to vitamin fortify the present R-T-E cereals, especially selected B vitamins, e.g., riboflavin. Conventional methods and techniques of vitamin fortification can be used herein. Due in part to their heat sensitivity, vitamin fortification is typically practiced by topical application to the R-T-E cereal and such a technique is preferred herein.

The present raw cereal components and other ingredients can be cooked and worked to form the present cooked cereal doughs by conventional cooked cereal dough preparation methods. The total moisture addition is controlled to provide a cooked cereal comprising about 10 to 60% moisture, preferably about 25 to 35% moisture.

The cereal dough cooking step can be practiced using a batch, atmospheric cooker and a low pressure extruder cooker especially those equipped with a conditioner precooker, or a twin screw extruder. The cereal is cooked with steam and sufficient amounts of added water for times and at temperatures sufficient to gelatinize the cereal starch and to develop desired levels of cooked cereal flavor.

Thus, in one preferred embodiment, rice bran oil can be added to the cereal and other dry ingredients prior to cooking. The rice bran oil bearing dry blend of cereal ingredients can then be combined with water, heated to cook and gelatinize the starchy constituents and mechanically worked to form a cooked cereal dough fortified with rice bran oil.

In one embodiment, the cereal ingredients are cooked in a cooker such as a single or twin screw cooker extruder to form a cooked cereal dough. In this variation, the added rice bran oil can function to lubricate the cooked cereal dough facilitation preparation of the directly expanded puffed cereal pieces. In a variation of this embodiment, the cooked cereal dough so prepared is extruded under well known direct expansion conditions of higher pressure and temperature to produce an expanded dried product. In another variation, the extruded cooked cereal dough is extruded under lower pressure and temperature conditions and subsequently formed into individual pieces. In this variation, the rice bran oil not only facilitates the preparation of the cooked cereal dough but also improves the workability of the cooked cereal dough so formed in subsequent piece forming steps from the cooked cereal dough.

In still another variation, a portion of the rice bran oil is added with the other dry cereal ingredients that are admixed with water, cooked and worked to form a partially fortified dough. The cooked cereal dough can be puffable such as by deep fat frying, microwave heating, gun puffing, jet zone heating, etc. More easily puffed doughs can have high levels of amylopectin-type starch supplied either by selection of high amylopectin containing starchy cereal materials, or by addition of pure amylopectin starches or both. By high amylopectin level herein is meant greater than 20% up to about 80% by weight.

Forming into Desirably Shaped and Sized Pieces

In certain embodiments, the present methods further can comprise the step of forming the rice bran oil bearing cooked cereal dough into individual pieces of desirable shape and size. Conventional techniques and equipment can be employed to practice this step and the skilled artisan will have no difficulty in selecting those suitable for use herein.

The present cereal compositions can be fabricated into any of a variety of common R-T-E cereal forms including, shreds, biscuits, flakes, or any common R-T-E cereal or cereal based snack product form, shape or size. The present cereal compositions can also be formulated and fabricated so as to provide puffed cereals of various shapes and sizes such as "O's". Especially desirable for use herein are planar squares, especially cinnamon flavored.

For example, a great number of R-T-E cereals and snack products are prepared from cooked cereal doughs that are formed into pellets. The cooked cereal dough can be fed to a pellet former to form pellets. For example, in the preparation of R-T-E cereals in flake form, the pellets are sized to have a pellet count of about 35 to 50 per 10 g and a moisture content of 16 to 20%.

In the preparation of a flaked R-T-E cereal, the pellets can be partially dried to moisture contents of about 18 to 20%. The pellets can then be formed into "wet" flakes having a thickness of about 380 to 635 μm (0.015 to 0.025 inch), preferably while warm 76.6 to 87.8° C. (170 to 190° F.) to form desirably shaped and sized wet flakes.

In still another variation, the dough can be sheeted to form sheets of dough (e.g., 25 to 800 microns in thickness) and the individual pieces formed by cutting the sheet into individual pieces or by stamping out planar shaped pieces from the dough sheet especially in squares.

In still another variation, the cooked cereal dough can be extruded through a die imparting a desired peripheral shape to form an extrudate cooked cereal dough rope. The dough rope can be cut to form individual shaped pieces.

In still another variation, the cooked cereal dough can be fed to a biscuit forming device (see, for example, U.S. Pat. No. 5,342,188, entitled "Device For Crimping and Cutting Dough Ropes, issued Aug. 30, 1994 to C. E. Zimmermann, which is incorporated herein by reference) which forms the dough into biscuit shaped individual pieces.

In another preferred variation, the cooked cereal dough is formed into individual "O" shaped pieces or rings, biscuits, shreds, figurines, letters, spheres or other geometric shapes, nuggets, or even irregular shapes.

Drying To Form Finished Pieces

The present methods further comprise the step of drying the shaped and sized individual pieces to form finished cereal products fortified with rice bran oil.

The skilled artisan will appreciate that the drying step depends in important part upon the desired end product. For example, for end products in the form of puffable half products or pellets for snack production, the drying step can be practiced to provide a finish moisture content of about 10 to 15%. However, when the desired end product is an R-T-E cereal, drying the pellets to these moisture contents may only be an intermediate or sub-step prior to, for example, flaking the dried pellets to form "wet" flakes. These "wet" flakes can then be subjected to a finish or final drying step wherein the pieces are dried to final dried moisture contents of 1 to 4% such as by toasting.

In still another variation as described above, the dough can be extruded under conditions of temperature and pressure so as to puff and expand (the "direct expansion" technique) and sectioned or cut into individual pieces to form individual expanded or puffed R-T-E cereal or snack pieces.

In another variation, the drying step can involve heating the pieces under conditions that not only dry the piece but also cause the piece to expand to form dried and puffed or flaked finished pieces. For example, pellets can be gun puffed to form dried puffed R-T-E cereal products. The wet flakes can be toasted to dry, expand and tenderize to form finished R-T-E cereal flakes.

Coating

The cereal pieces, however formed, can optionally be provided with a topical coating such as a sugar coating. In one variation, typically referred to as a wet sugar coating process, a concentrated liquid sugar syrup is applied to dried cereal pieces to form sugar coated pieces that are subsequently dried to remove the added moisture from the sugar coating solution to form presweetened R-T-E finished cereal pieces. In certain variations of this embodiment, a portion or preferably all of the sugar is replaced with an equivalent level of low conversion maltose (see, for example U.S. Ser. No. 60/565,473 "Low Sugar Presweetened Coated Cereals and Method of Preparation" filed Apr. 26, 2004).

In addition to sugar(s) and about 8-15% moisture the sugar coating or sugar slurry can include about 0.1% to about 20% of rice bran oil. Of course, sugar slurries are well known to include an oil ingredient. However, it has been surprisingly discovered herein to employ rice bran oil and especially the high oryzanol rice bran oil as the oil ingredient in the sugar slurry to provide finished products low in trans fatty acids. Preparation of sugar slurries involves substantial heat abuse. The heat exposure can include heating the ingredients to high temperature to insure complete or at least a controlled degree of undissolved sugars levels in the slurry prior to application. Also, the slurry is typically held at high temperatures (to prevent sugar crystallization) for extended times prior to application. Often, the slurry is subjected to a high temperature concentration step after make-up and prior to application. Also, the sugar slurry can be given still another high temperature heat step immediately prior to application to the cereal base pieces. It is a benefit that rice bran oil, especially the high oryzanol rice bran oil, is surprising that not only does rice bran oil provide low levels of trans fatty acids but also is resistant to accelerated deterioration when used as an ingredient in sugar slurries. The oryzanol constituents are surprisingly heat tolerant. Even when exposed to substantial heat abuse in sugar slurry preparation, storage and application, the resultant sugar coated R-T-E cereal pieces so prepared are resistant to oil rancidification (as expressed in low hexane values of 1ppm or less after 6 months storage) even when used at high concentrations in the sugar slurry and ad higher sugar coating applications levels. The sugar coating can be applied at application rates of sugar coating (dry weight basis) to cereal base ranging from about 10:100 to about 150:100, preferably about 40:100 to about 125:100 and for best results about 50:100 to about 100:100.

In other variations, an oil topical coating optionally with salt and/or flavors is applied to form finished dried snack products.

In still another variation, the pieces or pellets can be deep fat fried to form dried puffed fried finished cereal products fortified with rice bran oil. Such dried puffed fried finished cereal pieces are especially desirable as fiber fortified snack products. Such products can absorb about 5 to 35% of frying fat during the drying and puffing step.

Since rice bran oil does not require cooking, the rice bran oil can be added either before or after cooking. Conveniently, as described above, rice bran oil can be admixed with other dry cereal ingredients and water which is then cooked to form a cooked cereal dough. The cooked cereal dough fortified with rice bran oil so prepared is then formed into finished farinaceous products.

In commercial practice, one or more of the present methods' steps can be combined and performed in or by a single piece of equipment. For example, a dry mix of cereal ingredients including rice bran oil can be admixed with water and/or steam in a cooker extruder such as a single screw or twin screw. The cooker extruder heats, cooks and works the cereal ingredients to form a rice bran oil containing cooked cereal dough. In one variation, referred to in the art as direct expansion, the extruder conditions are such that upon extrusion, the cooked cereal dough expands and dries and is severed into small pieces to form R-T-E cereal pieces. The R-T-E cereal pieces can be in final form. In slight variations, the R-T-E cereal pieces can be further dried to final moisture contents, especially if a sugar coating is applied.

If desired, the present cereal compositions can be fabricated into presweetened R-T-E cereals such as by the topical application of a conventional sweetener coating. Both conventional sugar coatings and coatings employing high potency sweeteners, especially aspartame, potassium acesulfame and/or sucrose, are known and can be used to provide presweetened cereals for use herein.

Surprisingly, all or part of the rice bran oil herein can be topically applied to form a topical coating. Conveniently, the rice bran oil topical application step can be combined with the provision of the finished products herein with a topical sugar or pre-sweetening coating. If the present rice bran oil materials are topically applied in combination with the application of a topical pre-sweetener coating then preferred for use herein are the fructo oligo saccharides (FOS") materials, e.g. inulin. Such FOS materials are preferred since such FOS materials impart a slightly sweet taste. Also, the FOS materials are highly soluble and lend themselves readily to such topical application.

If employed, the topical sweetening is applied in sufficient amounts such that after drying to remove added moisture associated with the sugar coating solution, the sugar coating is present in a weight ratio of sugar coating to cereal base of about 1:100 to about 50:100, preferably 10:100 to about 40:100. Typically, the sugar coating solution will have a blend of sugars and will comprise about 4 to 20% moisture. When higher amounts of the sugar coating solution, particularly for those solutions employing higher moisture levels, the slurry coated cereal pieces may be subjected to a final drying step to remove the added moisture from the sugar coating to provide finished dried products having a moisture content of about 1 to 5%.

In those variations in which the rice bran oil material is added to the sugar coating, the sugar coating slurry can comprise about 1 to 40% rice bran oil. In other variations, the sugar coating solution is applied as one spray or stream onto the cereal base while simultaneously or concurrently applying the rice bran oil such as in a separate aqueous solution. If added as a separate aqueous solution, then the rice bran oil is present in that solution at its maximum solubility level so as to minimize moisture addition that must be subsequently removed by drying.

The finished dried R-T-E cereal and cereal based snack products fabricated from the rice bran oil fortified cooked cereal doughs herein are useful as consumer food products. Surprisingly, the finished R-T-E cereal and cereal based snack products provided herein are remarkably similar to their unfortified counterparts, notwithstanding the presence of the added rice bran oil ingredient. The products are characterized by good flavor, good texture and other favorable organoleptic attributes.

The products can be packaged and distributed in conventional form.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A cooked cereal dough food product low in trans fatty acids, comprising:
   A. about 85 to 99.9% (dry weight) of a starchy cereal dough; and
   B. in addition to any native fat content in the starchy cereal dough, about 0.1 to 15% by weight of the cooked cereal dough food product of added non-hydrogenated rice bran oil including at least 0.8% oryzanol, wherein the cooked cereal dough product exhibits a hexanal value of 1 ppm or less even after six months of storage at room temperature.

2. The food product of claim 1 wherein the rice bran oil ranges from about 0.5 to 8% (dry weight).

3. The food product of claim 2 wherein at least a portion of the rice bran oil is topically applied.

4. The food product of claim 2 wherein at least a portion of the rice bran oil is admixed with the cereal dough.

5. The food product of claim 4 wherein the food product has a moisture content of about 1 to 5%.

6. The R-T-E cereal of claim 5 additionally comprising a sugar coating.

7. The food product of claim 2 wherein the rice bran oil ranges from 2-4% (dry weight).

8. The food product of claim 1 wherein the food product is a cereal having a moisture content of about 10 to 60%.

9. The food product of claim 1 in the form of pellets having a moisture content ranging from about 16%-20%.

10. The food product of claim 1 wherein the food product is a puffed snack prepared by deep fat frying having a moisture content of about 1 to 5%.

11. The food product of claim 1 wherein the cooked cereal dough is puffable and the food product is puffed.

12. The food product of claim 11 wherein the food product is a puffed snack prepared by microwave heating or hot air puffing.

13. A method for preparing a fiber fortified food product comprising the steps of:
   A. providing a cooked cereal dough containing about 0.1% to 15% of the food product of added rice bran oil to form a non-hydrogenated rice bran oil fortified cereal dough, wherein at least a portion of rice bran oil is supplied by high oryzanol rice bran oil including at least 0.8% oryzanol;
   B. forming the rice bran oil fortified cereal dough into pieces; and
   C. drying the cereal pieces to form finished food products fortified with rice bran oil, wherein the finished food products exhibit a hexanal value of 1 ppm or less even after six months of storage at room temperature.

14. The method of claim 13, wherein the drying is practiced in at least two drying sub-steps.

15. The method of claim 14 wherein in step C, the method includes the sub-step of forming flaked pieces, and wherein the method includes toasting the flaked pieces to form toasted, dried flaked R-T-E pieces.

16. The method of claim 14 wherein the method further includes: providing a topical coating to the pieces.

17. The method of claim 14 wherein at least a portion of the rice bran oil is provided in the topical coating.

18. The method of claim 14 wherein the dried piece is an RTE cereal having a moisture content ranging from about 1% to 5%.

19. The method of claim 14 wherein the dried piece is a puffable pellet having a moisture content ranging from about 10-20% and the food product is puffed.

20. The method of claim 13 wherein at least a portion of the fortification involves admixing the rice bran oil with the cereal dough.

21. The method of claim 20 wherein in step B the cereal dough is cooked and includes adding at least a portion of rice bran oil to the dough after cooking.

22. The method of claim 21 wherein the moisture content of the cooked cereal dough ranges from about 10 to 60% by weight.

23. The method of claim 13 wherein the dough is leavened.

* * * * *